US009575836B2

(12) United States Patent
Barak et al.

(10) Patent No.: US 9,575,836 B2
(45) Date of Patent: *Feb. 21, 2017

(54) TEMPORARY PIPELINE MARKING FOR PROCESSOR ERROR WORKAROUNDS

(71) Applicant: International Business Machines Corporation, Armonk, NY (US)

(72) Inventors: Erez Barak, Kfar Saba (IL); Steven R. Carlough, Poughkeepsie, NY (US); Eyal Gonen, Nofit (IL); Juergen Haess, Schoenaich (DE); Silvia M. Mueller, Altdorf (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/251,316

(22) Filed: Aug. 30, 2016

(65) Prior Publication Data

US 2016/0357638 A1 Dec. 8, 2016

Related U.S. Application Data

(63) Continuation of application No. 15/074,219, filed on Mar. 18, 2016, which is a continuation of application No. 14/641,553, filed on Mar. 9, 2015.

(51) Int. Cl.
*G06F 11/00* (2006.01)
*G06F 11/14* (2006.01)
*G06F 9/38* (2006.01)

(52) U.S. Cl.
CPC .......... *G06F 11/142* (2013.01); *G06F 9/3867* (2013.01); *G06F 2201/805* (2013.01); *G06F 2201/82* (2013.01)

(58) Field of Classification Search
CPC ............ G06F 11/0721; G06F 11/0751; G06F 11/079; G06F 11/0793; G06F 9/3861; G06F 9/3863; G06F 9/3865; G06F 11/142
See application file for complete search history.

(56) References Cited

U.S. PATENT DOCUMENTS 6,745,321 B1 * 6/2004 Floyd ................... G06F 9/3836
710/267
8,443,227 B2 * 5/2013 Carlough ............. G06F 9/3017
714/3

(Continued)

OTHER PUBLICATIONS

List of IBM Patents or Patent Applications Treated as Related; (Appendix P), Oct. 24, 2016, 2 pages.

(Continued)

*Primary Examiner* — Michael Maskulinski
(74) *Attorney, Agent, or Firm* — Cantor Colburn LLP; Margaret A. McNamara

(57) ABSTRACT

Embodiments include a computer system for temporary pipeline marking for processor error workarounds, the computer system having a processor configured to perform a method. The method includes monitoring a pipeline of the processor for an event that is predetermined to place the processor in a stuck state that results in an errant instruction execution result due to the stuck state or repeated resource contention causing performance degradation. The pipeline is marked for a workaround action based on detecting the event. A clearing action is triggered based on the marking of the pipeline. The marking of the pipeline is cleared based on the triggering of the clearing action.

1 Claim, 6 Drawing Sheets

(56) References Cited

U.S. PATENT DOCUMENTS

2011/0154107 A1    6/2011    Alexander et al.
2012/0151263 A1    6/2012    Rentschler et al.

OTHER PUBLICATIONS

U.S. Appl. No. 14/641,553; filed Mar. 9, 2015; Entitled: Temporary Pipeline Marking For Processor Error Workarounds; First Named Inventor: Erez Barak.
U.S. Appl. No. 15/074,219; filed Mar. 18, 2016; Entitled: Temporary Pipeline Marking For Processor Error Workarounds; First Named Inventor: Erez Barak.
List of IBM Patents or Patent Applications Treated as Related; (Appendix P), Jan. 16, 2017, 2 pages.
U.S. Appl. No. 15/404,578; filed Jan. 12, 2017; Entitled: Temporary Pipeline Marking For Processor Error Workarounds; First Named Inventor: Erez Barak.

* cited by examiner

TEMPORARY PIPELINE MARKING FOR PROCESSOR ERROR WORKAROUNDS

PRIORITY

This application is a Continuation of legally related U.S. application Ser. No. 15/074,219 filed Mar. 18, 2016, which is a Continuation of U.S. patent application Ser. No. 14/641,553, filed on Mar. 9, 2015, the entire contents of which are incorporated herein by reference.

BACKGROUND

The present application relates generally to an improved data processing system and method. More specifically, the present application is directed to a system and method for temporary pipeline marking for processor error workarounds.

In modern processor design, especially in an out-of-order processor design, design flaws in a pipeline can result in control state information living beyond the instruction for which it is intended, resulting in incorrect processing of the next instruction in that pipeline. Hung state information (as this form of design error refers to) is one of the most difficult problems to find and solve during a design phase, and are often not found until later when the design is implemented in hardware.

As another example, one or more state values used by a state machine that manages a pipeline in a processor can have a hung or stuck state value if the pipeline is at least partially cleared by a pipeline flush or an instruction rescind. In the processor, conditions can occur which require instructions currently executing in execution unit hardware of the processor to be flushed. For example, branches, load operations that miss the cache, exceptions, and the like can result in a pipeline flush. When instructions are flushed, state machines and control sequencers may need to be reset for the next operation to be executed successfully.

Failure to properly flush state from the control hardware of an execution unit is a source of design errors in processor designs, particularly for cases where complex instructions iteratively run for many cycles in the execution hardware (divide operations, for example). If a design error that results in an incomplete state reset for a particular instruction or instruction type is caught early in the design process, the design can be fixed without substantial penalty. However, if the design error is not detected until late in the design process, developing a workaround can be difficult.

SUMMARY

Embodiments include a method for temporary pipeline marking for processor error workarounds. The method includes monitoring a pipeline of a processor for an event that is predetermined to place the processor in a stuck state that results in an errant instruction execution result due to the stuck state or repeated resource contention causing performance degradation. The pipeline is marked for a workaround action based on detecting the event. A clearing action is triggered based on the marking of the pipeline. The marking of the pipeline is cleared based on the triggering of the clearing action.

Embodiments include a computer system for temporary pipeline marking for processor error workarounds, the computer system having a processor configured to perform a method. The method includes monitoring a pipeline of the processor for an event that is predetermined to place the processor in a stuck state that results in an errant instruction execution result due to the stuck state or repeated resource contention causing performance degradation. The pipeline is marked for a workaround action based on detecting the event. A clearing action is triggered based on the marking of the pipeline. The marking of the pipeline is cleared based on the triggering of the clearing action.

Embodiments also include a computer program product for temporary pipeline marking for processor error workarounds, the computer program product including a computer readable storage medium having computer readable program code embodied therewith. The computer readable program code including computer readable program code is configured to perform a method. The method includes monitoring a pipeline of a processor for an event that is predetermined to place the processor in a stuck state that results in an errant instruction execution result due to the stuck state or repeated resource contention causing performance degradation. The pipeline is marked for a workaround action based on detecting the event. A clearing action is triggered based on the marking of the pipeline. The marking of the pipeline is cleared based on the triggering of the clearing action.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments include systems, methods and computer program products for temporary pipeline marking for processor error workarounds. During execution, a processor may contain latches that contain a stuck state in which an error may result from subsequent instruction execution based on the stuck state. Embodiments provide a workaround mechanism that allows test engineers to program conditions in hardware known to have design flaws when an event occurs that results in a latch containing stuck state information which will result in a subsequent error. Temporary pipeline marking may be implemented by a programmable condition engine that keeps track of possible stuck states in a pipeline and marks the pipeline for a workaround action based on detecting the event. For example, in an execution unit pipeline, a next instruction in the execution unit pipeline having a same instruction type as a programmable instruction operational code can be marked to initiate a stuck state clearing action upon instruction completion. A stuck state clearing action can be a complete purging of the pipeline, for example, by use of an XCOND. An XCOND is an immediate reset condition that cancels all current execution, clears latches, and restores the processor to the last completed, checked, and saved state. As another example, the stuck state clearing action may be a subsequent pipeline flush event based on the next instruction having the same instruction type reaching a same pipeline stage that results in the stuck state prior to completion of the next instruction, where the next instruction clears the stuck state by passing through the pipeline stage associated with the stuck state.

Figure 1:
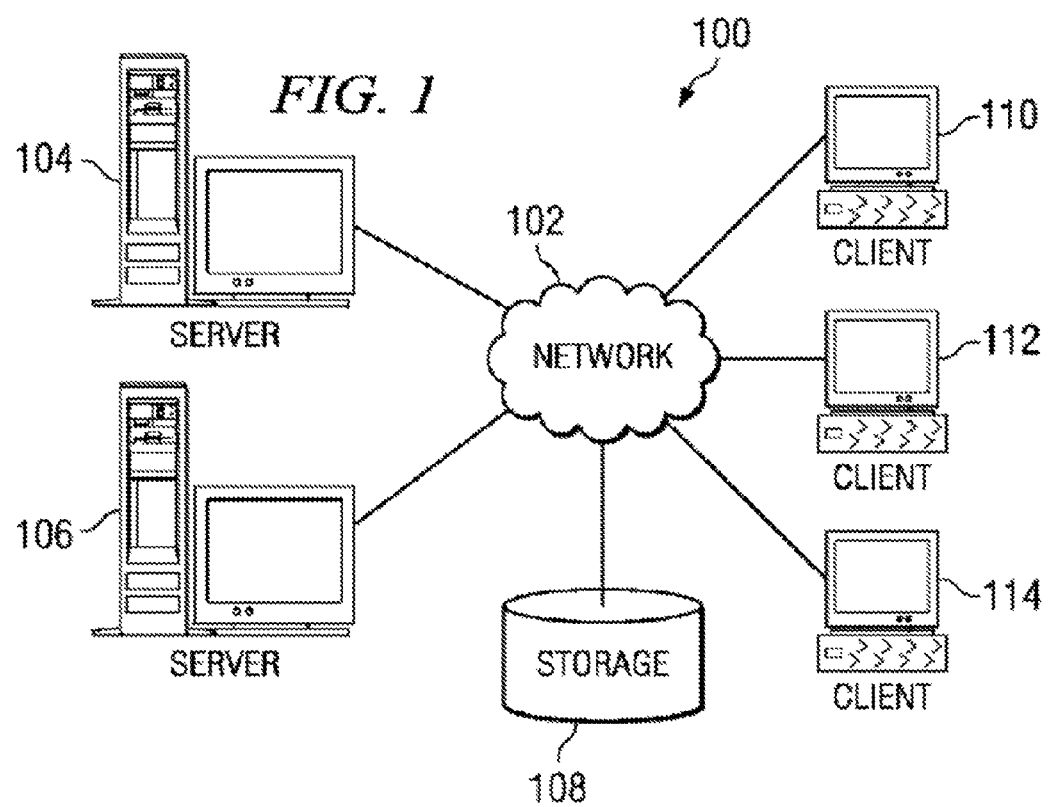
FIG. 1 is an exemplary diagram of a distributed data processing system in which aspects of the exemplary embodiments may be implemented.
Figure 2:
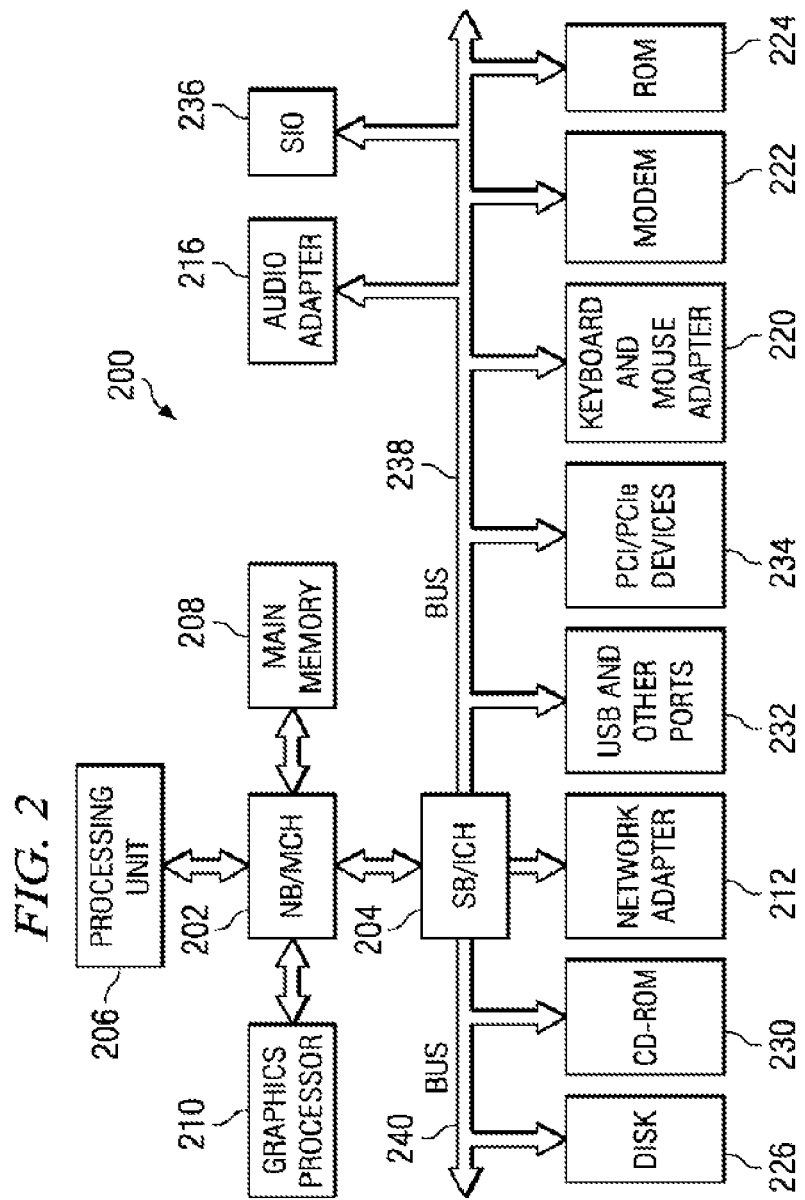
FIG. 2 is an exemplary block diagram of a data processing device in which aspects of the exemplary embodiments may be implemented.

The exemplary embodiments may be implemented in any processor of any computing device. For example, the exemplary embodiments may be used in any of a server computing device, client computing device, communication device, portable computing device, or the like. FIGS. 1-2 are provided hereafter as examples of a distributed data processing environment and computing devices in which exemplary aspects of the illustrative embodiments may be implemented. FIGS. 1-2 are only exemplary and are not intended to state or imply any limitation with regard to the types of computing devices in which the illustrative embodiments may be implemented. To the contrary, the exemplary embodiments may be implemented in any processor regardless of the particular machine or computing device in which the processor is ultimately operating.

With reference now to the figures, FIG. 1 depicts a pictorial representation of an exemplary distributed data processing system in which aspects of the illustrative embodiments may be implemented. Distributed data processing system 100 may include a network of computers in which embodiments of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the exemplary embodiments of the present invention may be implemented.

With reference now to FIG. 2, a block diagram of an exemplary data processing system is shown in which aspects of the exemplary embodiments may be implemented. Data processing system 200 is an example of a computer, such as server 104 or client 110 in FIG. 1, in which computer usable code or instructions implementing the processes for exemplary embodiments of the present invention may be located.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system. An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM System p, an IBM System z, or other computer system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for exemplary embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the exemplary embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
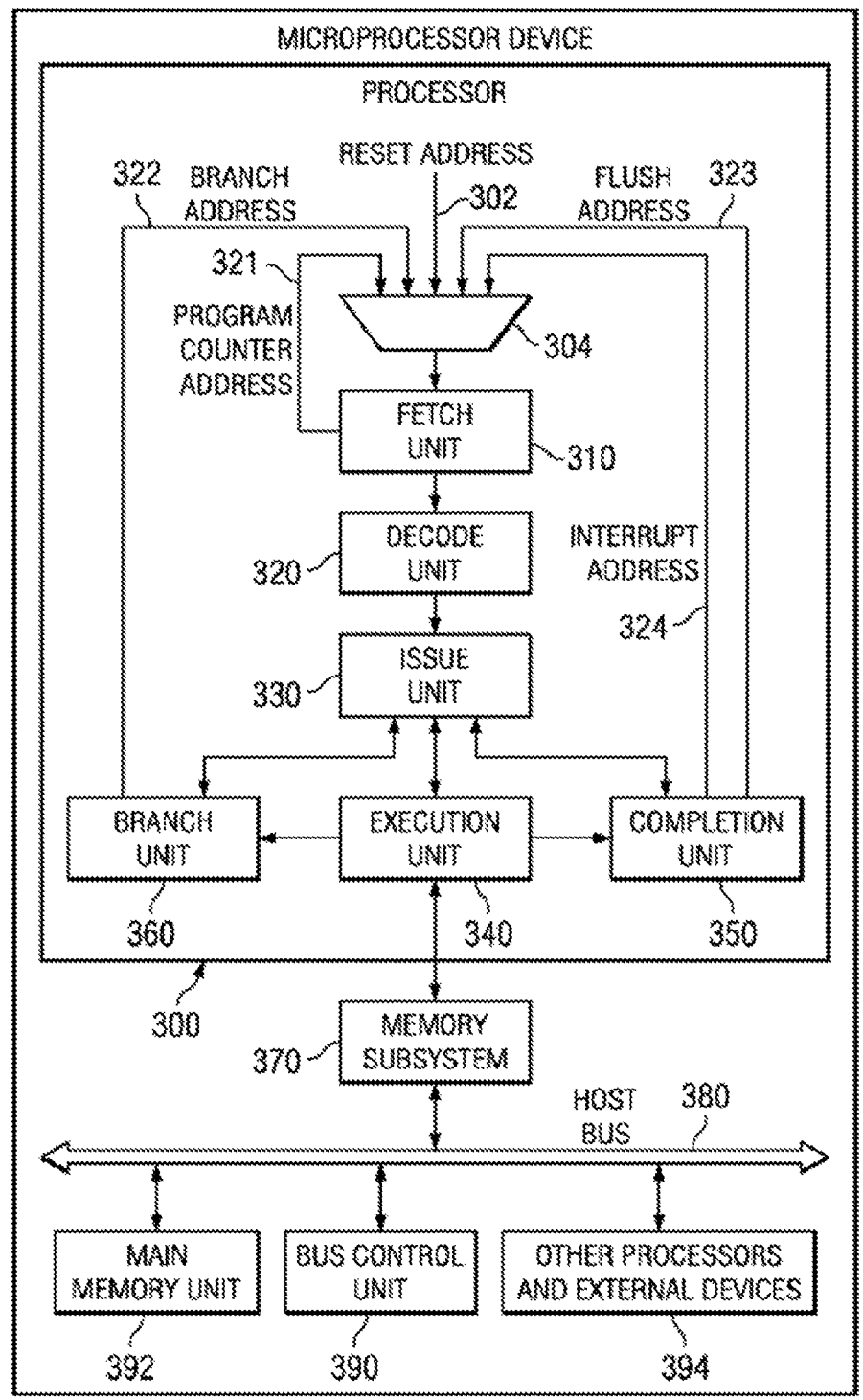
FIG. 3 is an exemplary diagram illustrating a pipeline of a processor in accordance with one exemplary embodiment.

FIG. 3 is an exemplary diagram illustrating a pipeline of a processor 300 in accordance with an embodiment. As shown in FIG. 3, the processor 300 includes a processor pipeline comprised of a fetch address multiplexer 304, a fetch unit 310, decode unit 320, issue unit 330, execution unit 340, completion unit 350, and branch unit 360. The fetch unit 310, decode unit 320, issue unit 330, execution unit 340, completion unit 350, and/or other units of the processor 300 not depicted in FIG. 3 may each have one or more pipelines with multiple stages. The processor 300 is coupled to memory subsystem 370, host bus 380, bus control unit 390, main memory unit 392, and other processor and external devices 394, such as those depicted in FIG. 2, for example. The fetch address multiplexer 304 selects an address from which the fetch unit 310 fetches instructions, such as reset address 302, program counter address 321, branch address 322, flush address 323, or interrupt address 324. The flush address 323 can be used to retry a set of instructions by reverting to an earlier point in an instruction stream. After instruction decoding by the decode unit 320, the issue unit 330 can route and sequence instructions to the execution unit 340, completion unit 350, and branch unit 360.

A stuck state value may exist within a pipeline of the fetch unit 310, decode unit 320, issue unit 330, execution unit 304, completion unit 350, and/or other units of the processor 300 not depicted in FIG. 3. The stuck state value can lead to errant results upon subsequent use of the pipeline in which the stuck state value resides. Embodiments provide an error workaround to clear stuck state values in one or more pipelines of the processor 300 using temporary pipeline marking.

Figure 4:
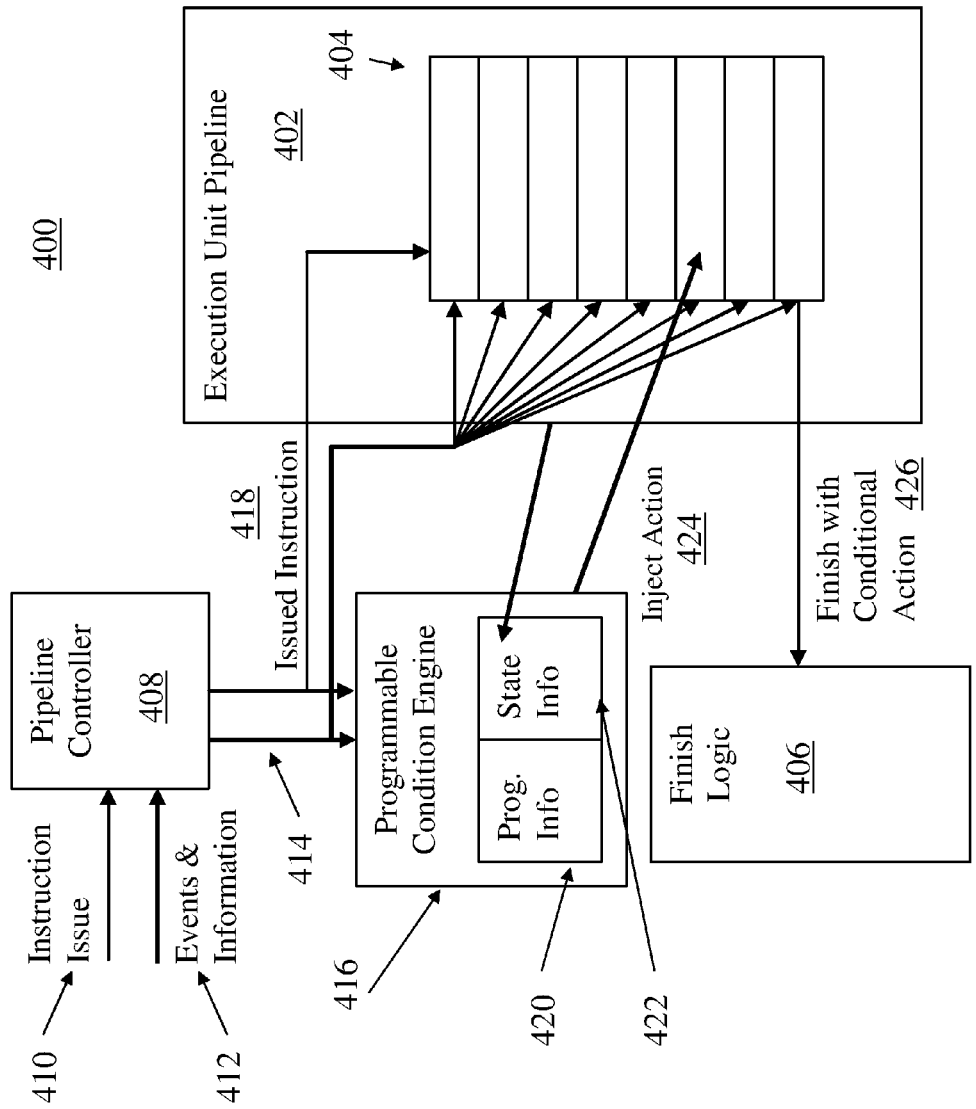
FIG. 4 illustrates a diagram of an execution unit pipeline with temporary pipeline marking in accordance with one embodiment.

Referring now to FIG. 4, a diagram 400 of an execution unit pipeline 402 with temporary pipeline marking in accordance with an embodiment is shown. The example of FIG. 4 depicts stages 404 of instruction execution as blocks of an 8-cycle deep pipeline, where instructions enter the top on instruction issue and finish out the bottom to finish logic 406. The finish logic 406 may be part of issue unit 330 or completion unit 350 of FIG. 3, where the execution unit pipeline 402 is part of execution unit 340 of FIG. 3. A pipeline controller 408 can receive an instruction issue 410 from the issue unit 330 and route it to the corresponding execution unit pipeline, such as the execution unit pipeline 402. It will be understood that multiple instances of the execution unit pipeline 402 can be implemented in the processor 300 of FIG. 3, such as different units for fixed-point and floating-point operations. The pipeline controller 408 can also receive events and information 412 that may include control signals, information, and conditions that may be associated with cancelling or flushing an instruction or instructions that are partially executed in pipeline stages 404. Examples include a pipeline flush event and/or a rescind event. A pipeline flush event may target a particular stage 404 or may clear out one more stages 404 and may require additional clearing of stages 404 for multiple cycles going forward, while a rescind event may clear only a single targeted stage 404 for a targeted instruction. To clear one or more stages 404, the pipeline controller 408 can track instruction execution and send out flush and kill indicators 414 to identify which stages 404 include an instruction or instructions that must be removed. A multi-cycle instruction may exist in several and possibly all of the stages 404 of the execution unit pipeline 402, depending on the length of execution and how far instruction execution has progressed when a kill request arrives. Temporary pipeline marking may be applied to execution unit pipeline 402 when one of these flush or rescind events occur if a design error has been found to exist that causes a latch on that pipeline to have incorrectly held state under these circumstances so the next instruction executed on that pipeline can finish with an XCOND.

In exemplary embodiments, a programmable condition engine 416 monitors issued instructions 418 that are sent to the execution unit pipeline 402 from the pipeline controller 408. The programmable condition engine 416 also receives one or more flush and kill indicators 414. Programming information 420 in the programmable condition engine 416 is set up to monitor for any one of a broad set of conditions specific to a problem area as an event that is predetermined to cause incorrect state to be held in a latch (stuck state) in execution pipeline 403. For example, if a stuck state is found upon killing a specific instruction, but the stuck state only occurs when the result is close to a predetermined limit, the programming information 420 can be set to only look for a killed instruction of the same type with results near the predetermined limit. One of more programmable instruction operational codes can be stored in the programming information 420 to identify the specific instruction or instruction type that triggers an action. The flexible set of programming information 420 allows pipeline marking to be invoked on either a very wide range of conditions or on a very specific set of conditions.

By limiting actions to target specific cases, performance impacts of the stuck state clearing action can be significantly limited, as only specific cases that are known to have problems will have to incur an extended period resetting action with an XCOND to completely purge the execution unit pipeline 402 and associated internal states.

Once a condition is identified on a killed/flushed instruction, state information 422 is set in the programmable condition engine 416. The state information 422 is used to inject an action 424 (i.e., a workaround action that temporarily marks the pipeline) onto the next instruction that executes on that execution unit pipeline 402. One example of the action 424 is an XCOND that triggers a reset (i.e., a stuck state clearing action on all latches) of the execution unit pipeline 402 as a complete purge and guarantees any state information in the execution unit 340 of FIG. 3 that potentially got stuck when the instruction was killed will be cleared. The programmable condition engine 416 may inject the XCOND as the action 424 on the instruction following the killed instruction, and it can also be verified that the instruction that includes the XCOND (i.e., a marked instruction) as the injected action 424 actually finishes by finishing with a conditional action 426 at finish logic 406. If the marked instruction does not finish, no XCOND will occur for the execution unit 340 of FIG. 3. If this happens, another instruction in the execution unit pipeline 402 can also be marked with XCOND as the inject action 424.

Groups of instructions that progress down a branch wrong path tend to be flushed together. Therefore, instructions on the execution unit pipeline 402 may continue to be marked with an XCOND as the action 424 until an instruction finally finishes with the conditional action 426 applied so the execution unit pipeline 402 can be reset.

In an alternate embodiment, instructions are not marked with an XCOND as the action 424 if the first instruction marked with as XCOND does not finish. For example, if a multi-cycle instruction is flushed, and a next instruction down the execution unit pipeline 402 is marked with an XCOND but also flushes, a third instruction is not marked with an XCOND. An XCOND may not be necessary to clear a stuck state, but simply sending another instruction down the execution unit pipeline 402 can clean up the execution unit pipeline 402. The next instruction having a same instruction type may gather and clear any stuck state as it passes down the execution unit pipeline 402. However, the instruction that clears the stuck state may be corrupted with the stuck state as it is gathered, resulting in a wrong result. If the instruction is also flushed, there is no need to perform an XCOND on the execution unit pipeline 402 as the stuck state is flushed away with the instruction that gathered it. Thus, the conditional action 426 may not be needed for a marked instruction where a previous instruction cleared the stuck state by passing through a stage 404 that is associated with the stuck state, where that previous instruction was flushed before reaching finish logic 406.

Figure 5:
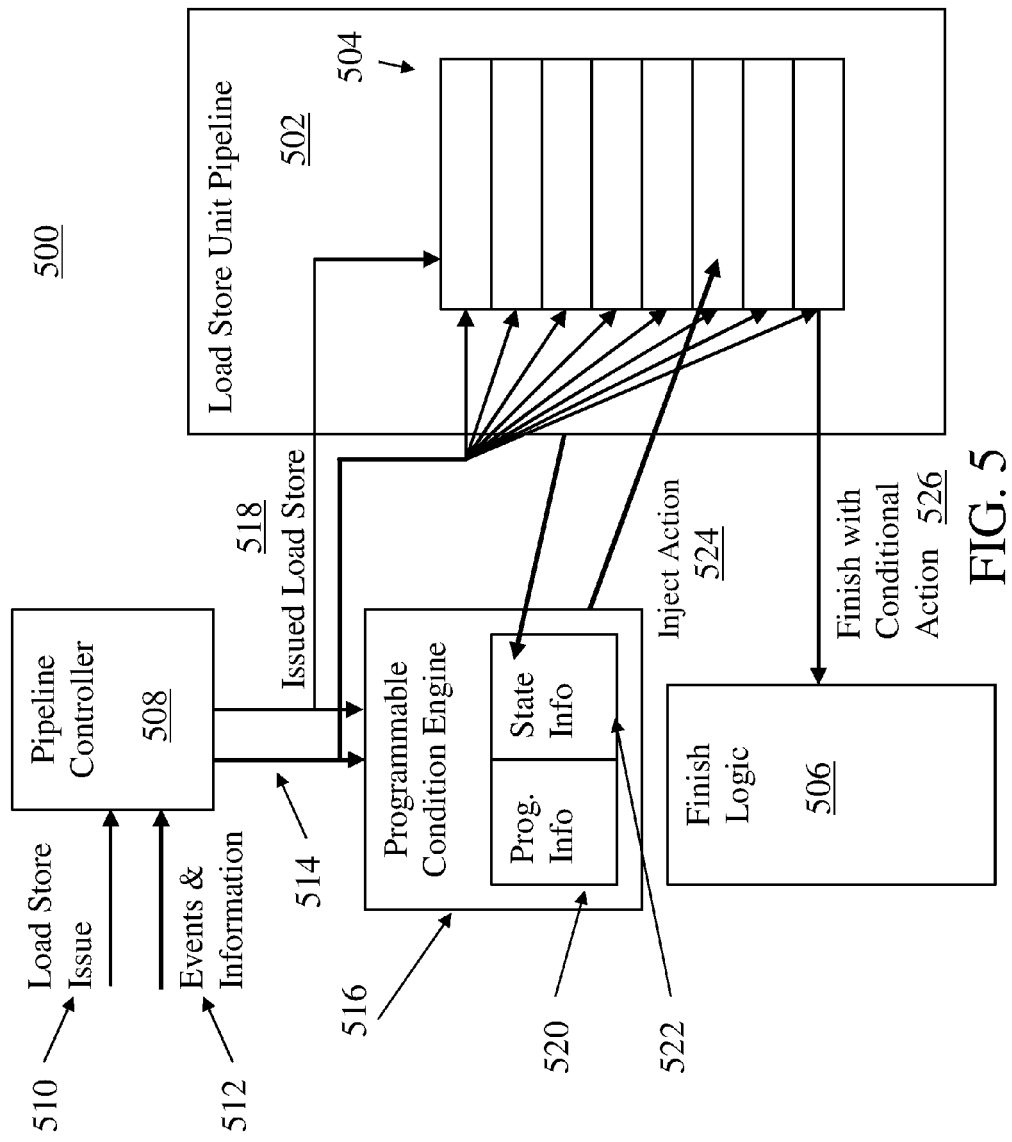
FIG. 5 illustrates a diagram of a load store unit pipeline with temporary pipeline marking in accordance with another embodiment.

FIG. 5 illustrates a diagram 500 of a load store unit pipeline 502 with temporary pipeline marking in accordance with an embodiment is shown. The load store unit pipeline 502 may be part of a load store unit coupled to the decode unit 320 and execution unit 340 of FIG. 3. The load store unit pipeline 502 includes a plurality of stages 504. Finish logic 506 may be allocated to the issue unit 330, the execution unit 340, and/or the completion unit 350 of FIG. 3. In the example of FIG. 5, a load store operation is issued 510 to a pipeline controller 508. Load store operations can access memory subsystem 370 of FIG. 3, as well as internal registers and caches (not depicted). Events and information 512 may be associated with a particular memory address. A programmable condition engine 516 can monitor for repeated resource contention with respect to a shared resource and trigger a workaround action as an inject action 524 upon confirming that the event has occurred for a predetermined number of times. For instance, programming information 520 can identify a contention address and a number of times to confirm. State information 522 may indicate a current state as issued load store operations 518 move through the stages 504 of the load store unit pipeline 502. Upon a finish with conditional action 526 reaching finish logic 506, the contention can be broken by forcing a complete purging of the load store unit pipeline 502 to stagger timing of attempted accesses to a shared resource. For instance, if the load store unit pipeline 502 performs an XCOND every third access conflict of a shared memory location, the timing of repeated resource contention is disturbed such that a resource contention condition is removed.

Figure 6:
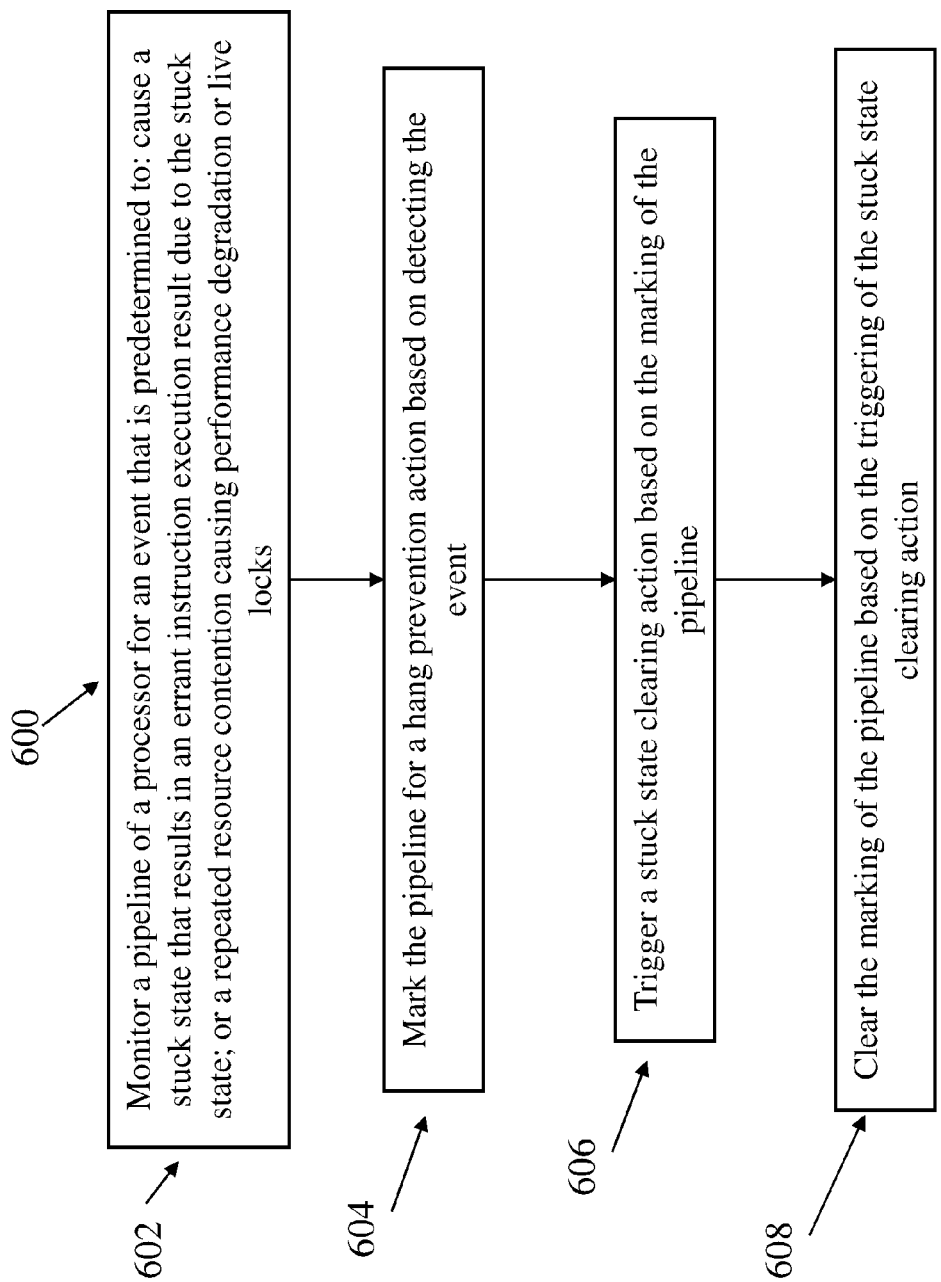
FIG. 6 illustrates a flow diagram of a method for temporary pipeline marking for processor error workarounds in accordance with an embodiment.

Referring now to FIG. 6, a flow chart diagram of a method 600 for temporary pipeline marking for processor error workarounds in a processor pipeline to prevent erroneous calculation or performance degradation due to repeated resource contention in accordance with an exemplary embodiment is shown. As shown at block 602, the method 600 includes monitoring a pipeline of a processor, such as processor 300 of FIG. 3, for an event that is predetermined to place the processor in a stuck state that results in an errant instruction execution result due to the stuck state or repeated resource contention. The pipeline may be the execution unit pipeline 402 of FIG. 4, and the event can be a pipeline flush event or a rescind event. The event may be associated with a programmable instruction operational code in programmable condition engine 416 of FIG. 4. The repeated resource contention may be with respect to a shared resource, and triggering a clearing action may include confirming that the event has occurred for a predetermined number of times, where the pipeline is the load store unit pipeline 502 of FIG. 5 and the event is associated with a memory address.

At block 604, the pipeline is marked for a workaround action based on detecting the event. Marking can be performed by injecting an action into the pipeline, such as adding an XCOND action to be executed upon finishing an instruction. At block 606, a clearing action is triggered based on the marking of the pipeline. The clearing action can clear a stuck state in one or more latches. The triggering of the clearing action may be conditionally triggered by a next instruction in the execution unit pipeline 402 of FIG. 4 having a same instruction type as the programmable instruction operational code. Finish logic in the processor can initiate the clearing action based on the marking and the next instruction having the same instruction type reaching the finish logic. The clearing action may be a subsequent pipeline flush event based on the next instruction having the same instruction type reaching a same pipeline stage that results in a stuck state prior to completion of the next instruction. At block 608, the marking of the pipeline is cleared based on the triggering of the clearing action. The clearing action may include a complete purging of the pipeline.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A computer system for temporary pipeline marking for processor error workarounds, the computer system comprising:

a processor comprising an execution unit pipeline, the
processor configured to perform:
monitoring the execution unit pipeline for an event that
is predetermined to cause a stuck state that results in
an errant instruction execution result due to the stuck
state, wherein the event comprises a pipeline flush
event or a rescind event, and the event is associated
with a programmable instruction operational code;
marking the execution unit pipeline for a workaround
action based on detecting the event;
triggering a clearing action based on the marking of the
execution unit pipeline, wherein the triggering is
conditionally triggered by a next instruction in the
execution unit pipeline having a same instruction
type as the programmable instruction operational
code, the clearing action comprises a complete purging of the execution unit pipeline; and
clearing the marking of the execution unit pipeline
based on the triggering of the clearing action,
wherein finish logic in the processor initiates the
clearing action based on the marking and the next
instruction having the same instruction type reaching
the finish logic and marks another instruction in the
execution unit pipeline to trigger the clearing action
based on determining that the next instruction having
the same instruction type did not finish at the finishing logic.

* * * * *